(12) United States Patent
Amada

(10) Patent No.: US 12,229,408 B2
(45) Date of Patent: Feb. 18, 2025

(54) MEMORY SYSTEM AND READ METHOD

(71) Applicant: Kioxia Corporation, Tokyo (JP)

(72) Inventor: Tadashi Amada, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 20 days.

(21) Appl. No.: 18/177,673

(22) Filed: Mar. 2, 2023

(65) Prior Publication Data
US 2023/0409203 A1 Dec. 21, 2023

(30) Foreign Application Priority Data
Jun. 20, 2022 (JP) .................. 2022-098996

(51) Int. Cl.
G06F 3/06 (2006.01)
(52) U.S. Cl.
CPC .......... G06F 3/0613 (2013.01); G06F 3/0659 (2013.01); G06F 3/0679 (2013.01)
(58) Field of Classification Search
CPC ..... G06F 3/0613; G06F 3/0655; G06F 3/0679
See application file for complete search history.

(56) References Cited

U.S. PATENT DOCUMENTS

| | | | |
|---|---|---|---|
| 10,025,532 B2 | 7/2018 | Manohar et al. | |
| 10,922,014 B1* | 2/2021 | Henze | G06F 3/0679 |
| 2004/0078527 A1* | 4/2004 | Tetrick | G06F 3/0601 |
| | | | 711/112 |
| 2018/0081758 A1* | 3/2018 | Leggette | G06F 21/10 |
| 2019/0384529 A1* | 12/2019 | Eliash | G06F 3/0659 |
| 2020/0004430 A1* | 1/2020 | Navon | G06F 3/0679 |
| 2020/0371940 A1* | 11/2020 | Navon | G06F 12/0868 |
| 2020/0409597 A1* | 12/2020 | Ganesh | G06F 3/0659 |
| 2020/0409852 A1* | 12/2020 | Benisty | G06F 3/0673 |
| 2021/0200448 A1 | 7/2021 | Chen et al. | |
| 2021/0208781 A1 | 7/2021 | Chen et al. | |
| 2022/0147440 A1* | 5/2022 | Benisty | G06F 12/0868 |
| 2022/0261346 A1* | 8/2022 | Jung | G06F 12/0862 |
| 2023/0342299 A1* | 10/2023 | Saraf | G06F 12/0246 |

* cited by examiner

Primary Examiner — Tracy A Warren
(74) Attorney, Agent, or Firm — Kim & Stewart LLP (57) ABSTRACT

A memory system includes a nonvolatile memory and a controller. The controller is configured to determine a first predicted read address as a subsequent read address following an input read address from which data is to be read, based on the input read address and a preset write sequence rule, determine a second predicted read address as the subsequent read address, based on the input read address and a read sequence history, select one of read addresses including the first and second predicted read addresses as a target read address, and read data from the target read address of the nonvolatile memory.

20 Claims, 8 Drawing Sheets

| INDEX | READ ADDRESS | |
|---|---|---|
| | WL ADDRESS (DIFFERENCE) | CHIP NUMBER |
| 1 | 1 | 0 |
| 2 | 0 | 1 |
| 3 | 0 | 2 |
| 4 | 0 | 3 |
| 5 | 2 | 0 |
| 6 | 1 | 1 |
| 7 | 0 | 2 |
| 8 | 0 | 3 |
| 9 | -2 | 0 |
| 10 | 0 | 1 |
| 11 | 0 | 2 |
| 12 | 0 | 3 |
| 13 | 3 | 0 |
| 14 | 0 | 1 |
| 15 | 0 | 2 |
| 16 | 0 | 3 |
| 17 | 2 | 1 |
| 18 | 1 | 2 |
| 19 | 0 | 3 |
| 20 | 1 | 0 |
| 21 | 1 | 1 |
| 22 | 1 | 2 |
| 23 | 0 | 3 |
| ... | ... | ... |

TIME ↓

40

102 (rows 9–12)
104 (row 13)

MEMORY SYSTEM AND READ METHOD

CROSS-REFERENCE TO RELATED APPLICATION

This application is based upon and claims the benefit of priority from Japanese Patent Application No. 2022-098996, filed Jun. 20, 2022, the entire contents of which are incorporated herein by reference.

FIELD

Embodiments described herein relate generally to a memory system and a read method.

BACKGROUND

A memory system executes read-ahead to improve read performance. The memory system predicts a target address of a read request before receiving the read request, and executes read-ahead by using the predicted address.

When the predicted address is different from the target address of the read request, reading is executed at the address indicated by the read request. At this time, the read-ahead using the predicted address is wasted. Therefore, it is desirable to improve accuracy of the target address predicted in read-ahead.

DETAILED DESCRIPTION

Embodiments provide a memory system and a read method for improving read performance.

In general, according to an embodiment, a memory system includes a nonvolatile memory and a controller. The controller is configured to determine a first predicted read address as a subsequent read address following an input read address from which data is to be read, based on the input read address and a preset write sequence rule, determine a second predicted read address as the subsequent read address, based on the input read address and a read sequence history, select one of read addresses including the first and second predicted read addresses as a target read address, and read data from the target read address of the nonvolatile memory.

Hereinafter, an embodiment will be described with reference to drawings. The following description illustrates devices and methods for embodying the technical idea of the embodiment, and the technical ideas of the embodiment are not limited to the structure, shape, arrangement, and materials of the elements described below. Modifications that may be easily conceived by those skilled in the art are naturally included in the scope of the disclosure. In order to make the description clearer, in the drawings, the size, thickness, planar dimension, and shape of each element may be changed from the actual embodiment and schematically represented. A plurality of drawings may include elements having different dimensional relationships and ratios to each other. In some drawings, corresponding elements may be denoted by the same reference numerals, and duplicate description may be omitted. Some elements may be given a plurality of names, but these examples of names are merely examples, and it is not denied that these elements are given other names. In addition, it is not denied that other names may be given to the elements which are not given a plurality of names. In the following description, "connection" may include not only direct connection but also connection via other elements.

Hereinafter, the present embodiment will be described in detail with reference to drawings.

Figure 1:
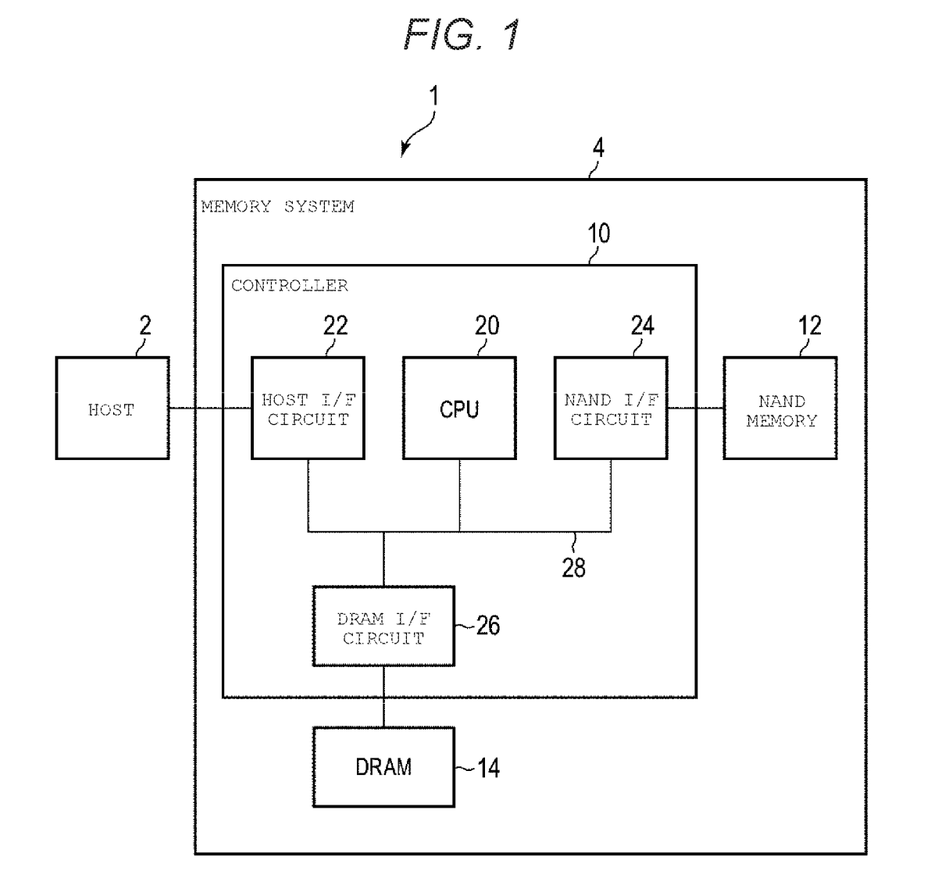
FIG. 1 is a block diagram illustrating an example of an information processing system including a host and a memory system according to an embodiment.

FIG. 1 is a block diagram illustrating an example of an information processing system 1 including a memory system 4 according to an embodiment and a host 2 connectable to the memory system 4. The memory system 4 is a storage device configured to write data to a nonvolatile storage medium, or read data from the nonvolatile storage medium. The memory system 4 is, for example, a solid state drive (SSD), a universal flash storage (UFS) device, or a memory card. The nonvolatile storage media include, for example, NAND flash memory, NOR flash memory, magneto-resistive random access memory (MRAM), phase change random access memory (PRAM), resistive random access memory (ReRAM), ferroelectric random access memory (FeRAM), and the like. Hereinafter, the memory system 4 including a NAND memory 12 as a nonvolatile storage medium will be described.

The host 2 is an information processing device as an external device that accesses the memory system 4. The host 2 may be a server (storage server) that stores a large amount of various kinds of data in the memory system 4. The host 2 may be a personal computer. The memory system 4 may be an SSD for business use incorporated in a server such as a data center. The memory system 4 may be an SSD for personal use incorporated in a personal computer.

The memory system 4 includes a controller 10, the NAND memory 12, and a dynamic random access memory (DRAM) 14. The memory system 4 may be used as a main storage for the host 2. The memory system 4 may be built in the host 2 or may be provided outside the host 2 and connected to the host 2 via a cable or network.

The controller 10 writes data to the NAND memory 12 or reads data from the NAND memory 12 according to a request transmitted from the host 2. The controller 10 may be configured with a circuit such as system on a chip (SoC).

The DRAM 14 is an example of a "volatile memory". The DRAM 14 is, for example, a double data rate 3 low voltage (DDR3L) standard DRAM. The DRAM 14 operates as a buffer memory that stores data that is supplied from the host 2 to the memory system 4 and is being written or is not yet written to the NAND memory 12, or data that is read from the NAND memory 12 and is being transferred or is not yet transferred to the host 2. The DRAM 14 includes an area for storing an address mapping table for defining association between a logical address for the address specified by the host 2 and a physical address of the NAND memory 12, an area for storing the requests received from the host 2, an area (referred to as a write buffer) for storing the data that is being written or not yet write to the NAND memory 12, and an area (referred to as a read buffer) for storing the data that is being transferred or not yet transferred to the host 2 after being read from the NAND memory 12.

The DRAM 14 as the volatile memory may be provided inside the controller 10 instead of being provided outside the controller 10. As the volatile memory, instead of the DRAM 14, a static random access memory (SRAM) that enables faster access may be used.

The NAND memory 12 includes a plurality of NAND chips. Each NAND chip includes a memory cell array including a plurality of memory cells disposed in a matrix. The memory cell array may be a two-dimensional memory cell array in which a plurality of memory cells are disposed in a plane, or a three-dimensional memory cell array in which a plurality of memory cells are disposed three-dimensionally. The memory cell array of each NAND chip includes a plurality of blocks. Each block is connected to common word lines.

The controller 10 includes a CPU 20, a host interface (host I/F) circuit 22, a NAND interface (NAND I/F) circuit 24 and a DRAM interface (DRAM I/F) circuit 26. The CPU 20, the host I/F circuit 22, the NAND I/F circuit 24, and the DRAM I/F circuit 26 are connected to a bus line 28.

The CPU 20 executes firmware stored in, for example, the NAND memory 12 to perform various functions. Various functions are, for example, the execution of host requests transmitted by the host 2. Host requests include, for example, host read requests and host write requests.

The host I/F circuit 22 is electrically connected to the host 2, the NAND I/F circuit 24 is electrically connected to the NAND memory 12, and the DRAM I/F circuit 26 is electrically connected to the DRAM 14.

The host I/F circuit 22 complies with one or more standards such as small computer system interface (SCSI), serial attached SCSI (SAS), AT attachment (ATA), serial ATA (SATA), PCI Express (PCIe™), Ethernet™, Fibre Channel™, NVM Express (NVMe™), Universal Serial Bus (USB™), universal asynchronous receiver/transmitter (UART™), and the like.

The NAND I/F circuit 24 complies with one or more standards such as Toggle DDR and Open NAND Flash Interface (ONFI).

Figure 2:
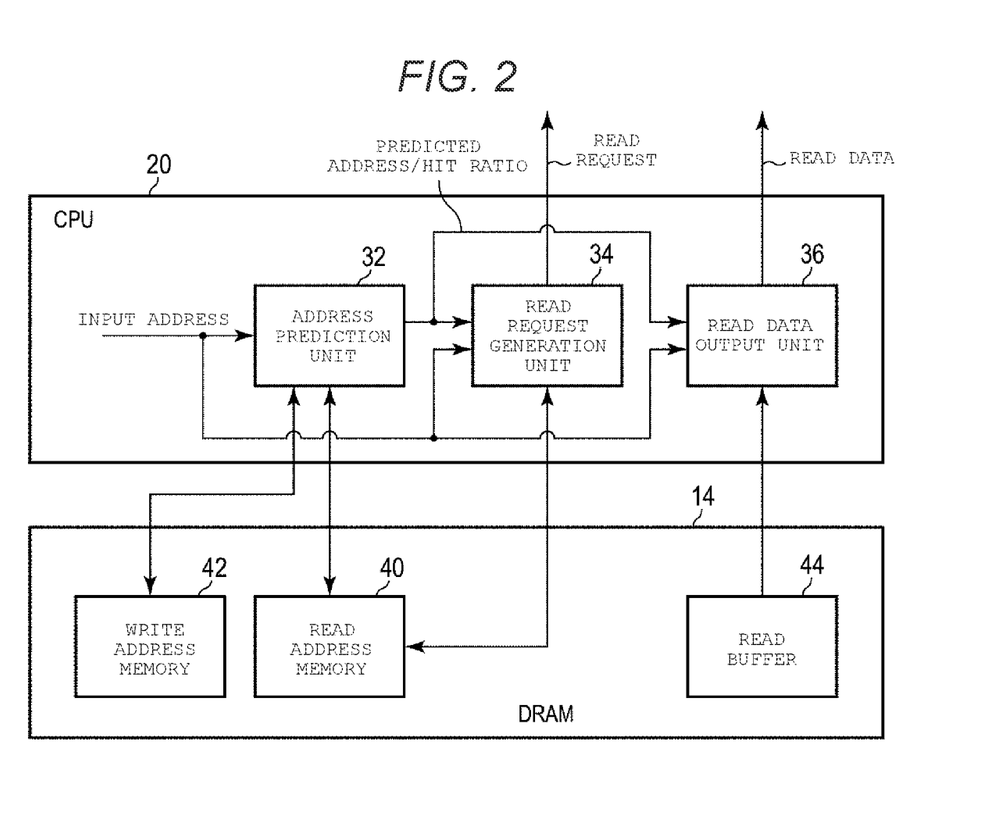
FIG. 2 is a functional block diagram illustrating an example of functions of a CPU according to the embodiment.

FIG. 2 is a functional block diagram illustrating an example of functions of the CPU 20. The CPU 20 includes an address prediction unit 32, a read request generation unit 34, and a read data output unit 36. The address prediction unit 32, the read request generation unit 34, and the read data output unit 36 are implemented by the CPU 20 executing the firmware stored in the NAND memory 12.

The DRAM 14 includes a read address memory 40, a write address memory 42, and a read buffer 44. The read address memory 40 and write address memory 42 are connected to the address prediction unit 32. The read address memory 40 is connected to the read request generation unit 34. The read buffer 44 is connected to the read data output unit 36.

The read address memory 40 stores a plurality of read addresses (may be referred to as read sequence history) transmitted from the read request generation unit 34.

The write address memory 42 stores write order data representing the order of writing write data to a plurality of NAND chips of the NAND memory 12. The memory system 4 stores preset write order data so that write data is written to the plurality of NAND chips in a specific order during writing. The write order data is set in accordance with the design specifications of the memory system 4. For example, the write order data represents ascending order of a chip 1, a chip 2, a chip 3, . . . , a chip N, descending order of the chip N, the chip (N−1), . . . , the chip 2, the chip 1, or discrete order of the chip 1, the chip 3, the chip 5, . . . , the chip 2, the chip 4, . . . , the chip (N−2).

The read address stored in the read address memory 40 and the write order data stored in the write address memory 42 are written to the NAND memory 12 and made nonvolatile when the power of the memory system 4 is shut down. The read address and write order data written in the NAND memory 12 are loaded to the DRAM 14 after the power of the memory system 4 is turned on.

When the host 2 transmits a host read request to the memory system 4 and the host I/F circuit 22 receives the host read request, the CPU 20 converts a logical address for the address specified in the host read request into a physical address by using the address mapping table. The physical address (hereinafter, referred to as an input address) is input to the address prediction unit 32, the read request generation unit 34, and the read data output unit 36. An example of the logical address is an address in unit of a plurality of consecutive addresses specified by the host 2. The physical address represents a physical storage location in the NAND memory 12.

The address prediction unit 32 determines two predicted addresses from the input address according to two prediction methods based on the read address stored in the read address memory 40 and the write order data stored in the write address memory 42.

The address prediction unit 32 uses the input address and the predicted address to calculate a hit ratio indicating whether or not the prediction for the predicted address is correct. The address prediction unit 32 transmits the predicted address and hit ratio to the read request generation unit 34 and the read data output unit 36.

The read request generation unit 34 generates a read request based on the input address, the predicted address, and the hit ratio. The read request generation unit 34 transmits the generated read request to the NAND I/F circuit 24 and also transmits the read address for the generated read request to the read address memory 40. The read address memory 40 stores a plurality of read addresses for a plurality of read requests transmitted to the NAND memory 12 in order of transmission.

The storage capacity of the read address memory 40 is predetermined and fixed. When the free storage capacity of the read address memory 40 becomes 0, the oldest read address is overwritten with a new read address.

The NAND I/F circuit 24 transmits a read request to the NAND memory 12. The NAND I/F circuit 24 receives read data from the NAND memory 12 in response to the read request. The read data from the NAND memory 12 is written to the read buffer 44.

The read data output unit 36 reads read data from the read buffer 44 and transmits the read data to the host I/F circuit 22. The host I/F circuit 22 transmits the read data to the host 2.

Figure 3:
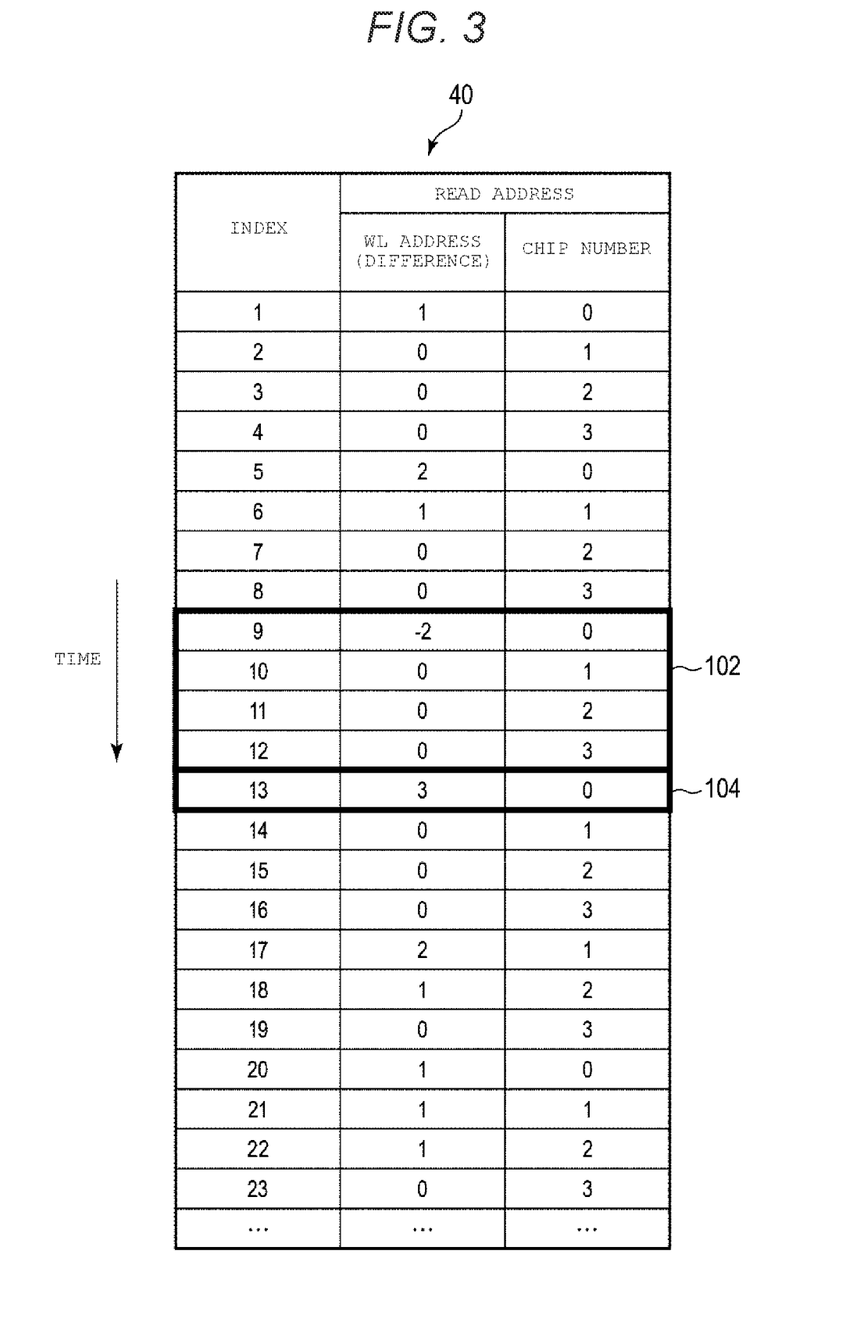
FIG. 3 is a diagram illustrating an example of a read address memory according to the embodiment.

FIG. 3 is a diagram illustrating an example of the read address memory 40. The physical address of the NAND memory 12 includes a chip number identifying a NAND chip, a block number identifying a block, and a word line address identifying a word line. The read address may also include a chip number, a block number, and a word line address.

The read address memory 40 stores chip numbers and read addresses including word line addresses. The number of word lines is very large compared to the number of blocks. For that reason, when predicting a read address, a word line address is important, but a block number is relatively not important. In order to reduce the size of data to be stored, the read address memory 40 does not store block numbers.

The address prediction unit 32 determines a predicted address from an input address according to a chip number and a change pattern of a word line address. When determining the predicted address, the address prediction unit 32 assumes that a block number is the same as the block number at a previous read request.

Further, in order to save storage capacity, the read address memory 40 does not store a word line address itself, but stores a word line address as a difference from the word line address for the previous read request. In this case, for example, the word line address itself of a first entry in the read address memory may be stored.

Figure 4:
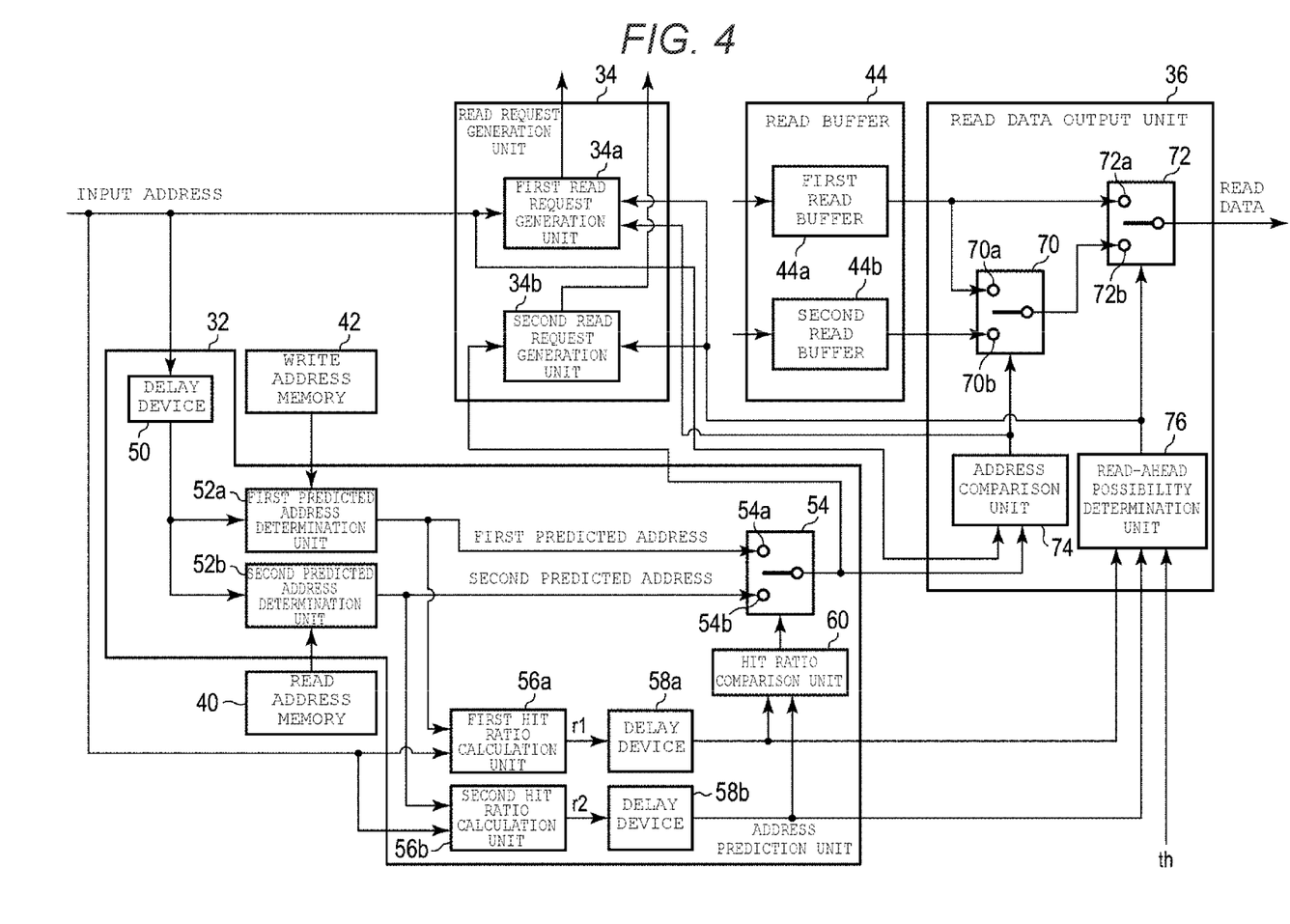
FIG. 4 is a block diagram illustrating an example of operations of an address prediction unit, a read request generation unit, and a read data output unit according to the embodiment.

FIG. 4 is a block diagram illustrating an example of operations of the address prediction unit 32, the read request generation unit 34, and the read data output unit 36.

The address prediction unit 32 includes a delay device 50, a first predicted address determination unit 52a, a second predicted address determination unit 52b, a first selector 54, a first hit ratio calculation unit 56a, a second hit ratio calculation unit 56b, delay devices 58a and 58b, and a hit ratio comparison unit 60.

The delay device 50 stores the input address for one read request. When the input address for the next read request is input to the delay device 50 while the input address for the one read request is stored in the delay device 50, the delay device 50 stores the input address for the next read request in place of the input address for the one read request. The input address for an n-th (n is a positive integer) read request is input to the first hit ratio calculation unit 56a and the second hit ratio calculation unit 56b. When the input address for an n-th read request is input to the delay device 50, the input address for an (n−1)th read request is input to the first predicted address determination unit 52a and the second predicted address determination unit 52b.

The first predicted address determination unit 52a is connected to the write address memory 42. The first predicted address determination unit 52a determines a first predicted address based on the (n+1)th read request based on an n-th input address and the write order data. For example, when the write order data indicates writing data to different chips in ascending order of the chip 1, the chip 2, the chip 3, . . . , and chip N, and the input address indicates a word line address 1 of the chip 1, the first predicted address indicates a word line address 1 of the chip 2.

The first predicted address determination unit 52a transmits the first predicted address to a first input terminal 54a of the first selector 54 and the first hit ratio calculation unit 56a.

The second predicted address determination unit 52b is connected to the read address memory 40. The second predicted address determination unit 52b dynamically predicts an address during a read operation according to a change pattern of the read address. For example, the second predicted address determination unit 52b includes a memory that stores a plurality of input addresses for a plurality of the most recent read requests (for example, four times). The second predicted address determination unit 52b determines a second predicted address based on the (n+1)th read request based on the change pattern of the input address for an (n−3)th read request, the input address for an (n−2)th read request, the input address for an (n−1)th read request, and the input address for the n-th read request. For example, the second predicted address determination unit 52b subsequently compares the change pattern of four input addresses for the (n−3)th to n-th read requests with an address group that is stored in the read address memory 40 and includes four read addresses. For example, as shown in FIG. 3, when n is index=12, the second predicted address determination unit 52b determines whether an address group 102 having a change pattern matching the change pattern of four input addresses whose indexes=9 to 12 exists in the read address memory 40. If any, the second predicted address determination unit 52b sets a read address 104 with index=13, which follows the address group 102, as the second predicted address.

The second predicted address determination unit 52b transmits the second predicted address to a second input terminal 54b of the first selector 54 and the second hit ratio calculation unit 56b.

The first hit ratio calculation unit 56a uses the input address and the first predicted address to calculate a first hit ratio r1 of the first predicted address. The first hit ratio calculation unit 56a compares the input address and the first predicted address, and determines whether or not the input address and the first predicted address match (prediction is correct). The first hit ratio calculation unit 56a includes a memory that stores a plurality of the most recent determination results (for example, four times). The first hit ratio r1 is the average value of the plurality of determination results, and indicates the ratio that prediction of the first predicted address is correct to the plurality of determination results. The first hit ratio r1 may be calculated by (the number of correctly predicted read requests)/(the total number of read requests). Instead of the calculation, the hit ratio may be obtained from the number of consecutive read requests for which the read prediction is correct. For example, when the input address and the first predicted address match, the determination result may be set to 100%, when the input address and the first predicted address do not match, the determination result may be set to 0%, and when the prediction of the four consecutive read requests is correct, the first hit ratio may be set to 100%.

The first hit ratio r1 is input to the hit ratio comparison unit 60 and the read data output unit 36 via the delay device 58a. The delay device 58a stores the first hit ratio r1 of the first predicted address based on one read request. When the first hit ratio r1 of the first predicted address based on the one read request is stored in the delay device 58a, if the first hit ratio r1 of the first predicted address based on the next read request is input to the delay device 58a, the delay device 58a stores the first hit ratio r1 of the first predicted address based on the next read request in place of the first hit ratio r1 of the first predicted address based on the one read request.

The second hit ratio calculation unit 56b uses the input address and the second predicted address to calculate a second hit ratio r2 of the second predicted address. The second hit ratio calculation unit 56b compares the input address and the second predicted address, and determines whether or not the input address and the second predicted address match (prediction is correct). The second hit ratio calculation unit 56b includes a memory that stores a plurality of the most recent determination results (for example, four times). The second hit ratio r2 is the average value of the plurality of determination results, and indicates the ratio that prediction of the second predicted address is correct to the plurality of determination results. The second hit ratio r2 may be calculated by (the number of correctly predicted read requests)/(the total number of read requests). Instead of the calculation, the hit ratio may be obtained from the number of consecutive read requests for which the read prediction is correct. For example, when the input address and the second predicted address match, the determination result may be 100%, when the input address and the second predicted address do not match, the determination result may be 0%, and when the prediction of the four consecutive read requests is correct, the second hit ratio may be 100%.

The second hit ratio r2 is input to the hit ratio comparison unit 60 and the read data output unit 36 via the delay device 58b. The delay device 58b stores the second hit ratio r2 of the second predicted address based on one read request. When the second hit ratio r2 of the second predicted address based on the one read request is stored in the delay device 58b, if the second hit ratio r2 of the second predicted address based on the next read request is input to the delay device 58b, the delay device 58b stores the second hit ratio r2 of the second predicted address based on the next read request in place of the second hit ratio r2 of the second predicted address based on the one read request.

The hit ratio comparison unit 60 compares the first hit ratio r1 and the second hit ratio r2. The hit ratio comparison unit 60 outputs a selection signal corresponding to the comparison result to the first selector 54. When the first hit ratio r1 is higher than the second hit ratio r2, the hit ratio comparison unit 60 causes the first selector 54 to select the first input terminal 54a. When the first hit ratio r1 is not higher than the second hit ratio r2, the hit ratio comparison unit 60 causes the first selector 54 to select the second input terminal 54b. The first selector 54 outputs an output signal according to the input selection signal. The output signal of the first selector 54 is transmitted to the read request generation unit 34 and the read data output unit 36.

The read request generation unit 34 includes a first read request generation unit 34a and a second read request generation unit 34b.

The read buffer 44 includes a first read buffer 44a and a second read buffer 44b.

The input address is further input to the first read request generation unit 34a. The first read request generation unit 34a uses the input address to generate a first read request, and transmits the first read request to the NAND I/F circuit 24 based on the signal from the read data output unit 36. The first read request is issued after receiving the input address. Reading in response to the first read request is executed after receiving the input address, and is also referred to as normal read.

The NAND I/F circuit 24 transmits the first read request to the NAND memory 12. The read data read from the NAND memory 12 in response to the first read request is written to the first read buffer 44a.

A predicted address (first predicted address or second predicted address) output from the first selector 54 is input to the second read request generation unit 34b. The second read request generation unit 34b uses the predicted address to generate a second read request, and transmits the second read request to the NAND I/F circuit 24 based on the signal from the read data output unit 36. The second read request is issued before the input address is received. The read in response to the second read request is executed before the input address is received, which is also referred to as read-ahead.

The NAND I/F circuit 24 transmits the second read request to the NAND memory 12. The read data read from the NAND memory 12 in response to the second read request is written to the second read buffer 44b.

The read data output unit 36 includes a second selector 70, a third selector 72, an address comparison unit 74, and a read-ahead possibility determination unit 76. The read data stored in the first read buffer 44a is transmitted to a first input terminal 70a of the second selector 70 and a first input terminal 72a of the third selector 72. The read data stored in the second read buffer 44b is transmitted to a second input terminal 70b of the second selector 70.

The input address and one of the first predicted address and the second predicted address output from the first selector 54 are input to the address comparison unit 74. The address comparison unit 74 determines whether or not the input address matches the one of the first predicted address and the second predicted address. The address comparison unit 74 transmits a comparison signal representing the determination result to the second selector 70 and the first read request generation unit 34a.

The second selector 70 selects the first input terminal 70a and the second input terminal 70b in response to the comparison signal. The second selector 70 selects the second input terminal 70b according to a comparison signal indicating that the input address matches the first predicted address or the second predicted address. The second selector 70 selects the first input terminal 70a according to a comparison signal indicating that the input address is not equal to the first predicted address or the second predicted address.

The first hit ratio r1 output from the delay device 58a and the second hit ratio r2 output from the delay device 58b are input to the read-ahead possibility determination unit 76. A read-ahead threshold value th is also input to the read-ahead possibility determination unit 76. The read-ahead possibility determination unit 76 determines whether or not read-ahead is to be carried out by determining whether or not the maximum value (that is, the greater one) of the first hit ratio r1 and the second hit ratio r2 is equal to or greater than the read-ahead threshold value th. The read-ahead possibility determination unit 76 transmits a possible/not possible signal indicating the determination result to the third selector 72, the first read request generation unit 34a, and the second read request generation unit 34b.

The third selector 72 selects the first input terminal 72a or a second input terminal 72b according to the possible/not possible signal. The third selector 72 selects the second input terminal 72b in response to a possible/not possible signal indicating that the larger one of the first hit ratio r1 and the second hit ratio r2 is equal to or greater than the read-ahead threshold value th (read-ahead is enabled). The third selector 72 selects the first input terminal 72a in response to a possible/not possible signal indicating that the larger one of the first hit ratio r1 and the second hit ratio r2 is less than the read-ahead threshold value th (read-ahead is not possible).

When the possible/not possible signal indicates that read-ahead is not possible, or when the possible/not possible signal indicates that read-ahead is possible and the predicted address does not match the input address, the first read request generation unit 34a transmits the first read request to the NAND I/F circuit 24. When the possible/not possible signal indicates that read-ahead is possible, the second read request generation unit 34b transmits the second read request to the NAND I/F circuit 24.

Figure 5:
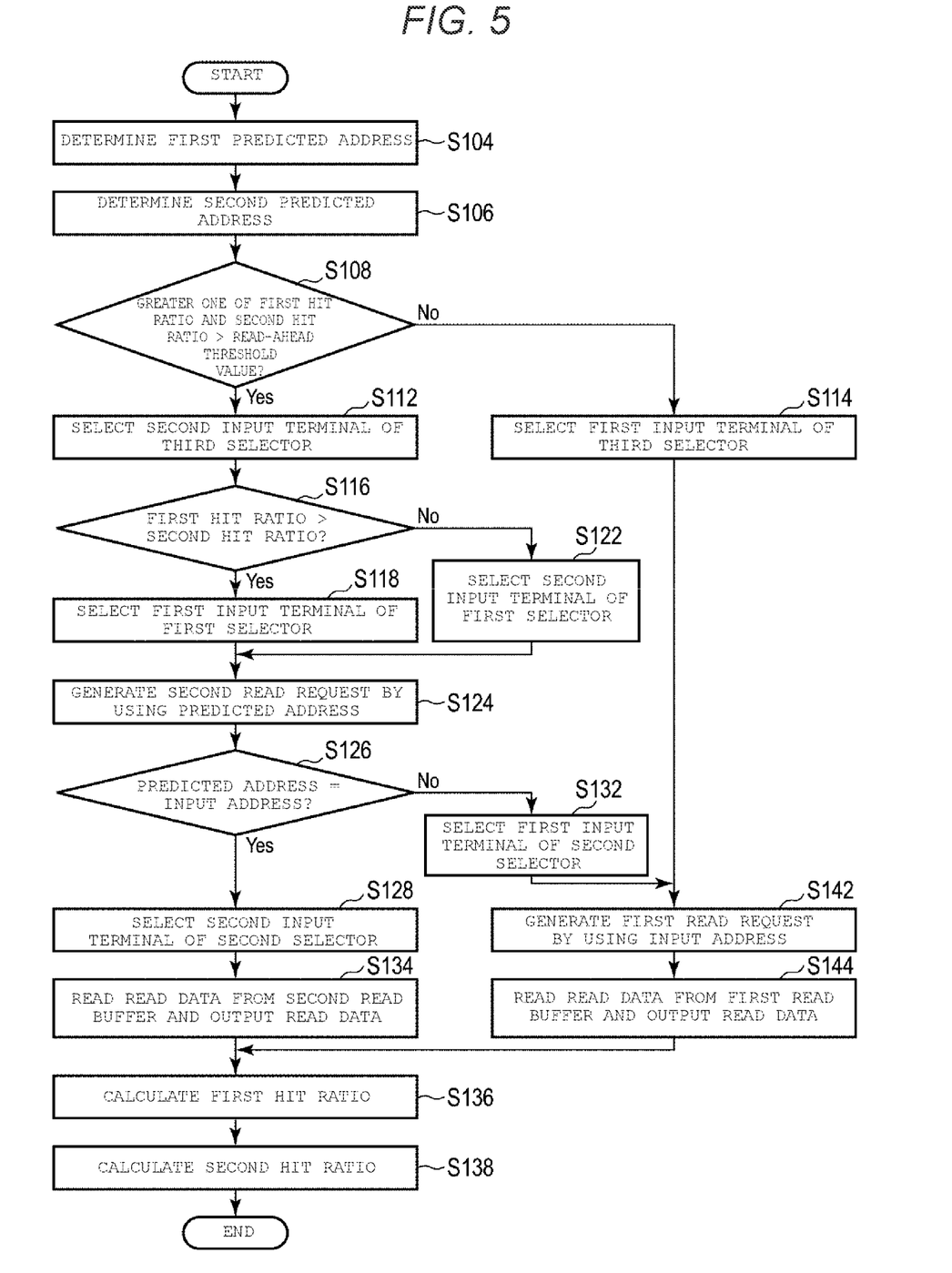
FIG. 5 is a flowchart illustrating an example of processing of a controller according to the embodiment.

FIG. 5 is a flowchart illustrating an example of processing of the controller 10.

The processing in FIG. 5 is started before the CPU 20 transmits the input address to the address prediction unit 32, the read request generation unit 34, and the read data output unit 36. It is assumed that the input address is the input address for the (n+1)th read request.

The first predicted address determination unit 52a determines a read address (a first predicted address) for the (n+1)th read request (S104) based on the input address for the n-th read request stored in the delay device 50 and the write order designated by the write order data stored in the write address memory 42.

Based on the input address for the n-th read request and the read address stored in the read address memory 40, the second predicted address determination unit 52b determines a read address (second predicted address) based on the (n+1)th the read request (S106).

The first hit ratio calculation unit 56a calculates the first hit ratio r1 by using the input address when the (n+1)th read request is received, and the first predicted address based on the n-th read request. Similarly, the second hit ratio calculation unit 56b calculates the second hit ratio r2 by using the input address when the (n+1)th read request is received, and the second predicted address based on the n-th read request.

The read-ahead possibility determination unit 76 compares a greater one of the hit ratio r1 transmitted from the delay device 58a and the hit ratio r2 transmitted from the delay device 58b with the read-ahead threshold value th to determine whether or not read-ahead is to be carried out (S108). Specifically, the read-ahead possibility determination unit 76 determines whether or not the greater one of the first hit ratio r1 and the second hit ratio r2 is greater than the read-ahead threshold value th. The read-ahead possibility determination unit 76 transmits a possible/not possible signal representing the determination result to the third selector 72.

When the greater one of the first hit ratio r1 and the second hit ratio r2 is greater than the read-ahead threshold value th (YES in S108), the third selector 72 selects the second input terminal 72b (S112). When the greater one of the first hit ratio r1 and the second hit ratio r2 is not greater than the read-ahead threshold value th (NO in S108), the third selector 72 selects the first input terminal 72a (S114).

After the processing of S112, the hit ratio comparison unit 60 determines whether or not the first hit ratio r1 is greater than the second hit ratio r2 (S116). A determination signal representing the determination result is input to the first selector 54. The first selector 54 selects an input terminal based on the determination signal.

When the first hit ratio r1 is greater than the second hit ratio r2 (YES in S116), the first selector 54 selects the first input terminal 54a (S118). When the first hit ratio r1 is not greater than the second hit ratio r2 (NO in S116), the first selector 54 selects the second input terminal 54b (S122). As a result, the first predicted address or the second predicted address is input to the second read request generation unit 34b and the address comparison unit 74 via the first selector 54.

After the processing of S118 or S122, the second read request generation unit 34b uses the first predicted address or the second predicted address to generate a second read request (S124).

The second read request is transmitted to the NAND I/F circuit 24. The NAND I/F circuit 24 transmits the second read request to the NAND memory 12. The NAND memory 12 executes read-ahead based on the predicted address based on the second read request. The read data read by the read-ahead is transmitted from the NAND memory 12 to the NAND I/F circuit 24. The read data is written to the second read buffer 44b.

When the (n+1)th input address is input to the address prediction unit 32, the address comparison unit 74 determines whether or not the (n+1)th predicted address used in the read-ahead matches the (n+1)th input address (S126). When the predicted address matches the input address, it may be determined that the read-ahead is successful. When the predicted address does not match the input address, it is possible to determine that the read-ahead is not successful. When it is determined that the read-ahead is not successful, normal read using the input address needs to be executed.

The address comparison unit 74 transmits the determination signal to the read request generation unit 34a and the second selector 70. The second selector 70 selects an input terminal based on the determination signal.

When the (n+1)th predicted address matches the (n+1)th input address (YES in S126), the second selector 70 selects the second input terminal 70b (S128). When the (n+1)th predicted address is not equal to the (n+1)th input address (NO in S126), the second selector 70 selects the first input terminal 70a (S132).

After the processing of S128, the read data output unit 36 reads the read data from the second read buffer 44b and outputs the read data via the second input terminal 70b of the second selector 70 and the second input terminal 72b of the third selector 72 (S134). The read data output from the read data output unit 36 is transmitted to the host 2 via the host I/F circuit 22.

The first hit ratio calculation unit 56a calculates (updates) the first hit ratio r1 based on the (n+1)th input address and the (n+1)th first predicted address (S136). The second hit ratio calculation unit 56b calculates (updates) the second hit ratio r2 based on the (n+1)th input address and the (n+1)th second predicted address (S138). This completes the processing for one input address.

After the processing of S114 or S132, the first read request generation unit 34a uses the input address to generate a first read request (S142).

The first read request is transmitted to the NAND I/F circuit 24. The NAND I/F circuit 24 transmits the first read request to the NAND memory 12. The NAND memory 12 executes normal read based on the input address for the first read request. The read data read by the normal read is transmitted from the NAND memory 12 to the NAND I/F circuit 24. The read data is written to the first read buffer 44a.

The read data output unit 36 reads read data from the first read buffer 44a and outputs the read data via the first input terminal 72a of the third selector 72 (S144). The read data output from the read data output unit 36 is transmitted to the host 2 via the host I/F circuit 22.

After the processing of S144, the processing of S136 is executed.

Figure 6:
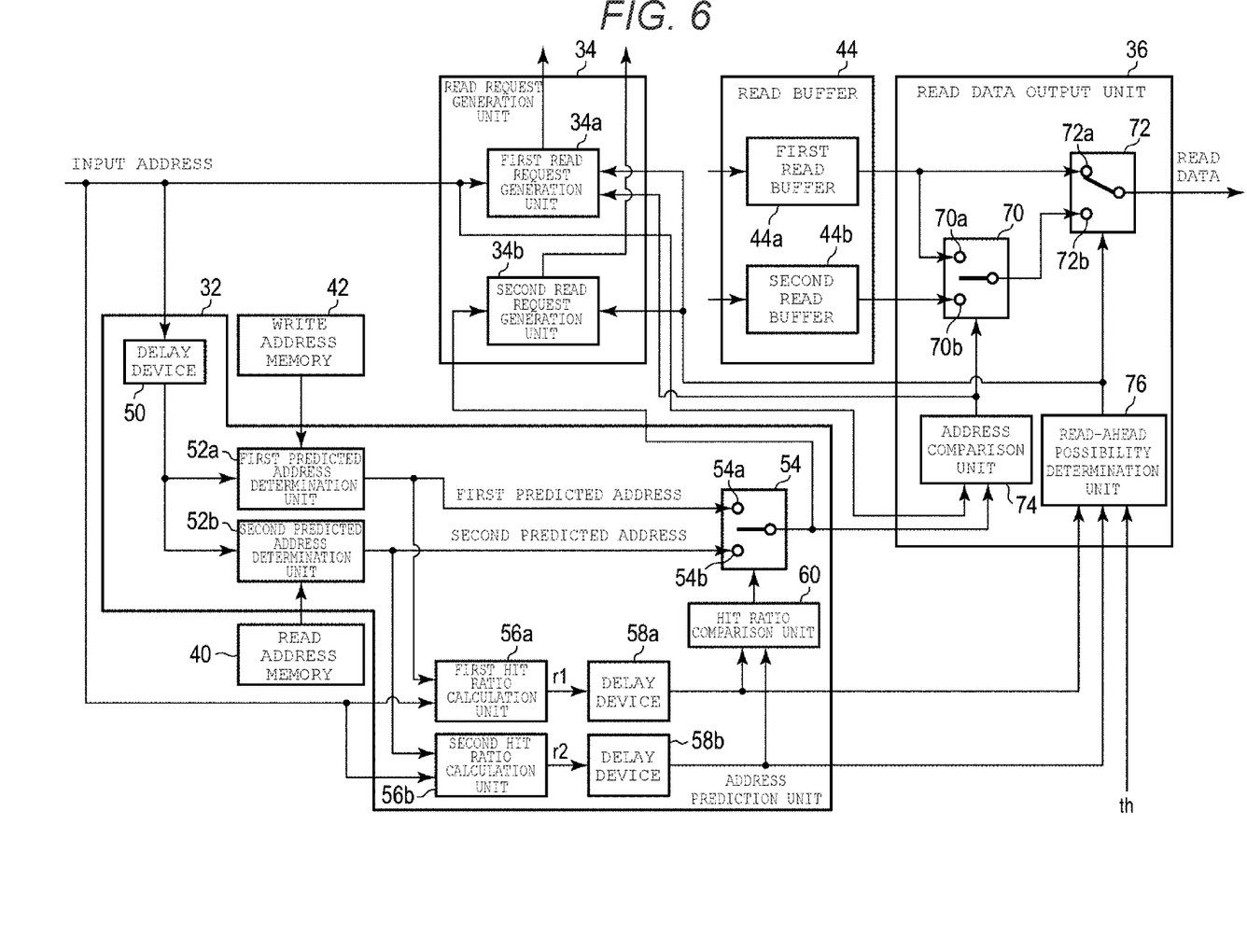
FIG. 6 is a block diagram illustrating an example of the address prediction unit and the read data output unit according to the embodiment when executing a normal read operation.

FIG. 6 is a block diagram illustrating an example of the address prediction unit 32 and the read data output unit 36 when executing a normal read operation without executing a read-ahead operation. FIG. 6 shows the states of the address prediction unit 32 and the read data output unit 36 after execution of the processing of S114, S142, and S144 in the flowchart of FIG. 5. That is, the read-ahead possibility determination unit 76 outputs a possible/not possible signal indicating that read-ahead is not possible. The third selector 72 selects the first input terminal 72a according to this possible/not possible signal. The first read request generation unit 34a generates a first read request according to this possible/not possible signal. The read data read from the NAND memory 12 in response to the first read request is written to the first read buffer 44a. The read data read from the first read buffer 44a is output via the third selector 72 (first input terminal 72a).

Figure 7:
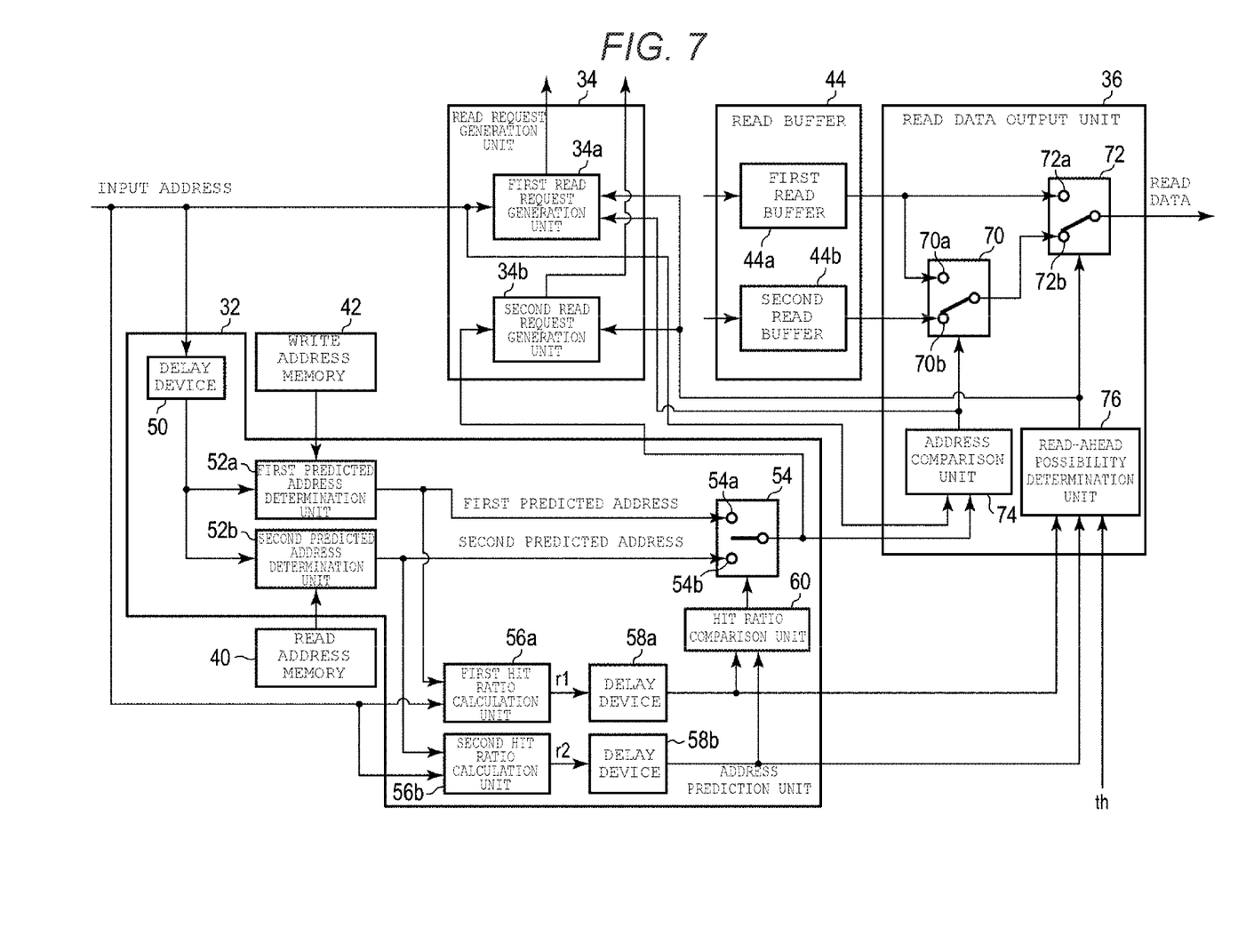
FIG. 7 is a block diagram illustrating an example of the address prediction unit and the read data output unit according to the embodiment when executing a read-ahead operation.

FIG. 7 is a block diagram illustrating an example of the address prediction unit 32 and the read data output unit 36 when executing a read-ahead operation. FIG. 7 shows the states of the address prediction unit 32 and the read data output unit 36 after execution of the processing of S112, S118 (or S122), S124, S128, and S134 in the flowchart of FIG. 5. That is, the read-ahead possibility determination unit 76 outputs a possible/not possible signal indicating the possibility of read-ahead. The third selector 72 selects the second input terminal 72b according to this possible/not possible signal. The second read request generation unit 34b generates a second read request in response to this possible/not possible signal. The read data read from the NAND memory 12 in response to the second read request is written to the second read buffer 44b. The address comparison unit 74 outputs a comparison signal indicating that the input address matches the predicted address. The second selector 70 selects the second input terminal 70b according to this comparison signal. The read data read from the second read buffer 44b is output via the second selector 70 (second input terminal 70b) and the third selector 72 (second input terminal 72b).

Figure 8:
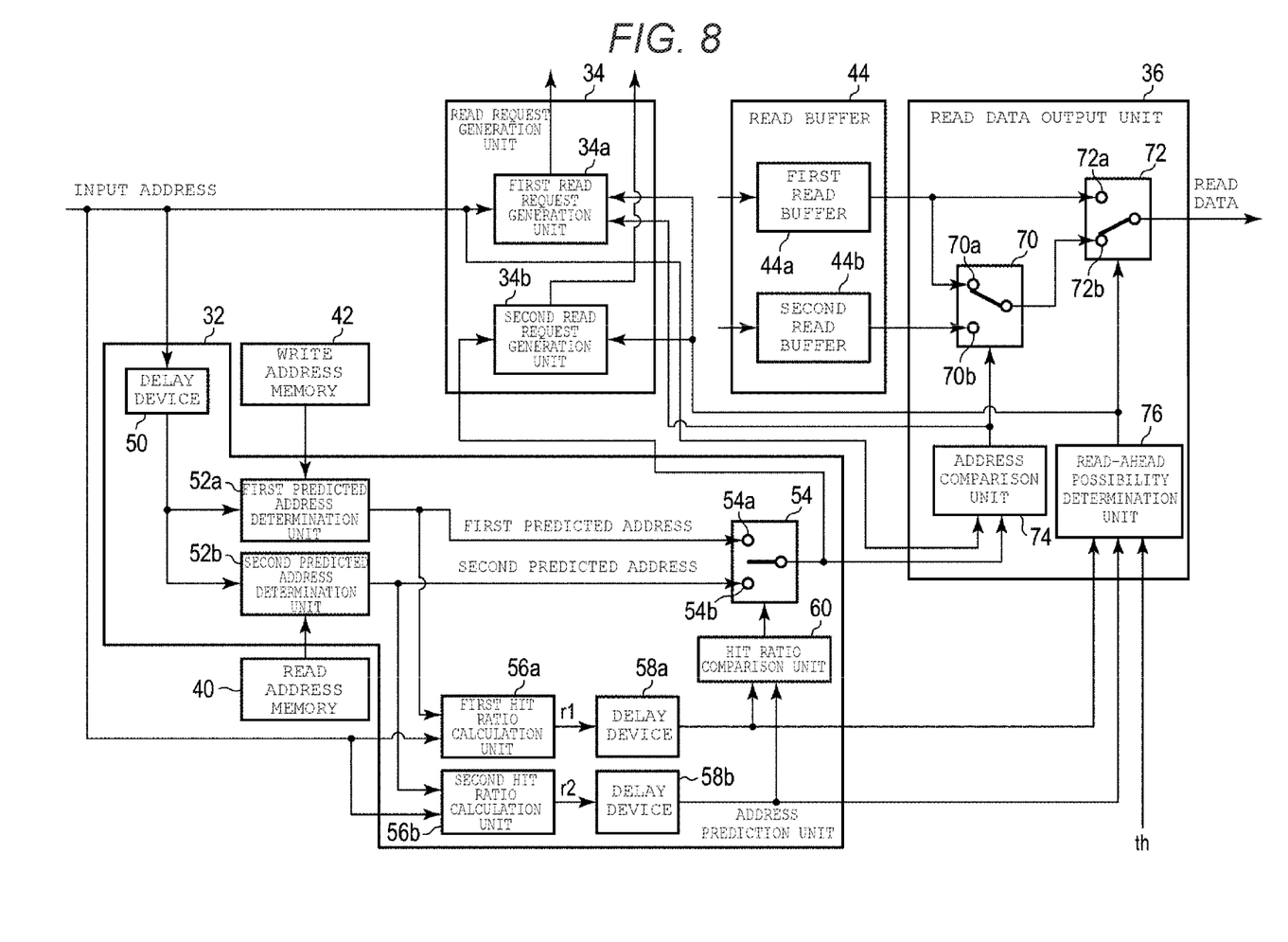
FIG. 8 is a block diagram illustrating an example of the address prediction unit and the read data output unit according to the embodiment when executing a normal read operation after a read-ahead operation does not succeed.

FIG. 8 is a block diagram illustrating an example of the address prediction unit 32 and the read data output unit 36 when normal read is executed after a read-ahead operation does not succeed. FIG. 8 shows the states of the address prediction unit 32 and the read data output unit 36 after execution of the processing of S112, S118 (or S122), S124, S132, S142, and S144 in the flowchart of FIG. 5. That is, the read-ahead possibility determination unit 76 outputs a possible/not possible signal indicating the possibility of read-ahead. The third selector 72 selects the second input terminal 72b according to this possible/not possible signal. The address comparison unit 74 outputs a comparison signal indicating that the input address and the predicted address do not match. The second selector 70 selects the first input terminal 70a according to this comparison signal. The first read request generation unit 34a generates a first read request according to this comparison signal. The read data read from the NAND memory 12 in response to the first read request is written to the first read buffer 44a. The read data read from the first read buffer 44a is output via the second selector 70 (first input terminal 70a) and the third selector 72 (second input terminal 72b).

According to the above embodiment, the first predicted address is determined based on the input address and the write order data, and the second predicted address is determined based on the input address and the read addresses for the plurality of the most recent read requests. The first hit ratio is calculated that indicates how much the first predicted address matches the input address. The second hit ratio is calculated that indicates how much the second predicted address matches the input address.

When the greater one of the first hit ratio and the second hit ratio is equal to or greater than the threshold value, a read-ahead operation is executed before the input address is received. A read-ahead request is generated by using a predicted address with a high hit ratio. Therefore, when reading in a case where the read address changes in an order different from the order in which write data is written, since read-ahead is executed by using the second predicted address predicted by using the read address, the read-ahead is highly likely to succeed. Therefore, read performance is improved.

When the read-ahead is not successful, a normal read operation is executed, and therefore the data specified by the input address may be read.

When the greater one of the first hit ratio and the second hit ratio is less than the threshold value, read-ahead is highly likely not to succeed, a read-ahead operation is not executed, and a normal read operation is executed. As a result, the possibility of an unnecessary read-ahead operation being executed is low, and the read performance is improved.

A modification example will be described. The number of predicted addresses is not limited to two, and may be three or more. For example, during a write operation, some write data may be written according to write order data, but the rest of the write addresses may be written without in compliance with the write order data. In this case, the DRAM 14 includes a second write address memory. The address prediction unit 32 includes a third predicted address determination unit in parallel with the first predicted address determination unit 52a and the second predicted address determination unit 52b, a third hit ratio calculation unit in parallel with the first hit ratio calculation unit 56a and a second hit ratio calculation unit 56b, and a third delay device in parallel with the delay devices 58a and 58b. A second write address of the write data written not in compliance with the write order data is stored in the second write address memory. The third predicted address determination unit may compare a change pattern of a plurality of input addresses for a plurality of the most recent read requests with a write address group including a plurality of second write addresses to determine a third predicted address.

The address input to the address prediction unit 32 is described as a physical address, but may be predicted as a logical address.

The read address referred to when the second predicted address determination unit 52b determines the second predicted address is stored in the read address memory 40. A large number of read addresses need to be stored in the read address memory 40 in order to improve the accuracy of prediction. If the second predicted address determination unit 52b is configured to use a time-series data learning algorithm to determine the second predicted addresses, the number of read addresses stored in the read address memory 40 can be reduced compared to the embodiment. Alternatively, when storing the same number of read addresses, the modification example improves the hit ratio of the second predicted address compared to the embodiment.

An example of obtaining the first hit ratio r1 and the second hit ratio r2 by a simple average for a certain period is described, but an example of obtaining by an average value of average values for a plurality of periods, an example of calculating by an arithmetic average, and an example of obtaining by a recursive average may be adopted.

While certain embodiments have been described, these embodiments have been presented by way of example only, and are not intended to limit the scope of the disclosure.

Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a nonvolatile memory; and
a controller configured to:
  determine a first predicted read address as a subsequent read address following an input read address from which data is to be read, based on the input read address and a preset write sequence rule;
  determine a second predicted read address as the subsequent read address, based on the input read address and a read sequence history;
  select one of the first and second predicted read addresses as a target read address based on address hit data indicating a level of prediction success of the first predicted read address and the second predicted read address; and
  read data from the target read address of the nonvolatile memory.

2. The memory system according to claim 1, wherein
the preset write sequence rule designates a preset order of data writing to the nonvolatile memory, and
the read sequence history indicates a sequence of read addresses from which data have been read.

3. The memory system according to claim 1, wherein
the address hit data includes a first hit ratio indicating the level of prediction success of the first predicted read address and a second hit ratio indicating a level of prediction success of the second predicted read address, and
the controller is configured to select one of the first and second predicted read addresses as the target read address corresponding to a higher one of the first and second hit ratios.

4. The memory system according to claim 3, wherein the controller is configured to select:
the first predicted address as the target read address when the first hit ratio is higher than the second hit ratio and a predetermined threshold,
the second predicted address as the target read address when the second hit ratio is higher than the first hit ratio and the predetermined threshold, and
a subsequent input read address following the input read address as the target read address when neither the first nor the second hit ratio is higher than the predetermined threshold.

5. The memory system according to claim 1, wherein the controller is further configured to receive a subsequent input read address following the input read address after reading the data from the target read address.

6. The memory system according to claim 5, wherein the controller is further configured to:
compare the target read address with the subsequent input read address;
output the data read from the target address when the target read address matches the subsequent input read address; and
read data from the subsequent input read address and output the data read from the subsequent input read address when the target read address does not match the subsequent input read address.

7. The memory system according to claim 6, wherein
the controller is configured to select one of the first and second predicted read addresses as the target read address based on a first hit ratio indicating a level of prediction success of the first predicted read address and a second hit ratio indicating a level of prediction success of the second predicted read address, and
the controller is further configured to update at least one of the first and second hit ratios based on a comparison result of the target read address with the subsequent input read address.

8. The memory system according to claim 1, wherein the controller is further configured to:
determine a third predicted read address as the subsequent read address, based on the input read address and a write sequence history, which indicates a sequence of write address to which data have been written not in compliance with the preset write sequence rule; and
select one of the first, second, and third predicted read addresses as the target read address.

9. A method for reading data from a nonvolatile memory, comprising:
determining a first predicted read address as a subsequent read address following an input read address from which data is to be read, based on the input read address and a preset write sequence rule;
determining a second predicted read address as the subsequent read address, based on the input read address and a read sequence history;
selecting one of the first and second predicted read addresses as a target read address based on address hit data indicating a level of prediction success of the first predicted read address and the second predicted read address; and
reading data from the target read address of the nonvolatile memory.

10. The method according to claim 9, wherein
the preset write sequence rule designates a preset order of data writing to the nonvolatile memory, and
the read sequence history indicates a sequence of read addresses from which data have been read.

11. The method according to claim 9, wherein
the address hit data includes a first hit ratio indicating a level of prediction success of the first predicted read address and a second hit ratio indicating a level of prediction success of the second predicted read address, and
said selecting is carried out based on a higher one of the first and second hit ratios.

12. The method according to claim 11, wherein said selecting comprises:
selecting the first predicted address as the target read address when the first hit ratio is higher than the second hit ratio and a predetermined threshold;
selecting the second predicted address as the target read address when the second hit ratio is higher than the first hit ratio and the predetermined threshold; and
selecting a subsequent input read address following the input read address as the target read address when neither the first nor the second hit ratio is higher than the predetermined threshold.

13. The method according to claim 9, further comprising:
receiving a subsequent input read address following the input read address after reading the data from the target read address.

14. The method according to claim 13, further comprising:
- comparing the target read address with the subsequent input read address;
- outputting the data read from the target address when the target read address matches the subsequent input read address; and
- reading data from the subsequent input read address and outputting the data read from the subsequent input read address when the target read address does not match the subsequent input read address.

15. The method according to claim 14, wherein
- one of the first and second predicted read addresses is selected as the target read address based on a first hit ratio indicating a level of prediction success of the first predicted read address and a second hit ratio indicating a level of prediction success of the second predicted read address, and
- the method further comprises updating at least one of the first and second hit ratios based on a comparison result of the target read address with the subsequent input read address.

16. The method according to claim 9, further comprising:
- determining a third predicted read address as the subsequent read address, based on the input read address and a write sequence history, which indicates a sequence of write address to which data have been written not in compliance with the preset write sequence rule, and
- the target address is selected from read addresses including the first, second, and third predicted read addresses.

17. A memory system comprising:
a nonvolatile memory; and
a controller configured to:
- determine a first predicted read address as a subsequent read address following an input read address from which data is to be read, based on the input read address and a write sequence history;
- determine a second predicted read address as the subsequent read address, based on the input read address and a read sequence history;
- select one of read addresses including the first and second predicted read addresses as a target read address; and
- read data from the target read address of the nonvolatile memory, wherein the write sequence history indicates a sequence of write address to which data have been written not in compliance with a preset write sequence rule designating a preset order of data writing to the nonvolatile memory, and
the read sequence history indicates a sequence of read addresses from which data have been read.

18. The memory system according to claim 1, wherein the nonvolatile memory includes a NAND flash memory.

19. The method according to claim 9, wherein the nonvolatile memory includes a NAND flash memory.

20. The memory system according to claim 17, wherein the nonvolatile memory includes a NAND flash memory.

* * * * *